3,084,095
FUNGICIDAL DITHIOCARBAMIC ACID DERIVATIVES

Krijn van den Boogaart, Vlaardingen, Netherlands, assignor to Fabriek van Chemische Producten Vondelingenplaat N.V., Rotterdam, Netherlands, a corporation of the Netherlands
No Drawing. Filed July 28, 1959, Ser. No. 829,983
Claims priority, application Netherlands Aug. 1, 1958
6 Claims. (Cl. 167—22)

The invention relates to a new fungicidal dithiocarbamic acid derivatives and a process for the preparation thereof.

For a large number of dithiocarbamic acid derivatives the fungicidal properties are known (according to the thesis of H. Klöpping: "Chemical Constitution and Antifungal Action of Sulphur Compounds," Utrecht, 1951, and Communications from the Agricultural University and the Government Research Stations at Ghent, 1956, vol. XXI, pp. 305–339).

Now it has been found that a novel group of fungicidal dithiocarbamic acid derivatives can be prepared when ethylene diamine is condensed with formaldehyde in a quantity of at least one mole of ethylene diamine per mole of formaldehyde and the condensation product thus obtained is converted into dithiocarbamic acid derivatives.

The conversion into dithiocarbamic acid derivatives can be effected in the usual way, e.g. by converting the condensation product of ethylene diamine and formaldehyde with carbon disulphide and an inorganic base or an organic amine.

The formula of the fungicides obtained has not been completely clarified yet. It is known that 1 mole of ethylene diamine reacts with 2 moles of formaldehyde to form a compound with a polycyclic structure (Beilstein, 4th ed., vol. IV, p. 250). This compound, however, does not react with $CS_2$ and a base to form dithiocarbamic acid derivatives. It is also known that an organic amine is able to form a Schiff base with formaldehyde; however, a Schiff base does not react with $CS_2$ and a base either.

A satisfactory working-hypothesis is the formula (I) 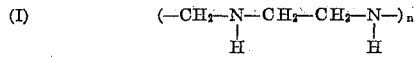

for products which are obtained by reacting 1 mole of ethylene diamine with 1 mole of formaldehyde.

The formula (II) 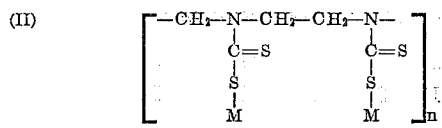

may represent the products which are obtained by converting the condensation products with the Formula I in the usual way with $CS_2$ and an inorganic base or an amine. In both formulae M stands for a metal or an ammonium group which may or may not be substituted by one or more alkyl, aryl or aralkyl groups, and $n$ stands for an integer, 1 or above.

When a fungicide according to the invention with the Formula II is prepared, in which M stands for sodium, a product is obtained which deviates from disodium-ethylenebisdithiocarbamate (Nabam) in respect of solubility and content of water of crystallization. The corresponding diammonium salt is much less soluble than diammoniumethylenebisdithiocarbamate (Ambam). This might indicate the formation of organic chains, and in view of this the possibility that the Formulae I and II are correct would seem fairly great.

Starting from the sodium compound having the Formula II the salts of bi- or polyvalent metals e.g. of copper, cadmium, mercury, manganese and zinc, were prepared by converting the sodium salt by double decomposition with a soluble salt of said bivalent metals, for instance with chlorides of the said polyvalent metals. The zinc and manganese salts were compared with the zinc and manganese salts of ethylenebisdithiocarbamic acid (Zineb and Maneb, resp.). The decomposition was determined with the aid of Clarke's method for the determination of $CS_2$. The results of the comparative determination are included in the table.

TABLE

| | molecules of water of crystallization | solubility, g./100 ml. of solution | decomposition after 6 weeks at 40° C., percent | colour |
|---|---|---|---|---|
| compound with the formula II in which M=Na | 3 | 60 | | white. |
| Nabam | 6 | 40 | | Do. |
| compound with the formula II in which M=NH$_4$ | 0 | 8.6 | | Do. |
| Ambam | 0 | 70 | | Do. |
| compound with the formula II in which the two symbols M together stand for a zinc atom | 0 | | 0 | pale yellow. |
| Zineb | 0 | | 5 | white. |
| compound with the formula II in which the two symbols M together stand for a manganese atom | 2 | | 0 | brownish yellow. |
| Maneb | 2 | | 12 | yellow. |

If more than 1 mole of ethylene diamine is reacted with one mole of formaldehyde, a product is obtained the formula of which might be (III)   $[(CH_2)_n(-NH-CH_2-CH_2-NH-)_{n+1}]H_2$ By reacting this product with $CS_2$ and a base, one obtains fungicides which can be represented by the formula (IV) 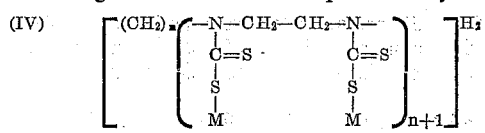

In these formulae M and $n$ have the above significations. It is found that in particular the products with the Formula IV, in which M=sodium and $n=1$, have a very low $LD_{50}$, viz. of 6 parts by weight per million. This fungicide is obtained by converting 2 moles of ethylene diamine with 1 mole of formaldehyde and treating the condensation product with $CS_2$ and NaOH.

This $LD_{50}$ value was obtained according to the spore germination method on Fusarium culmorum with cherry juice as stimulant. The substance to be tested is introduced in the form of a solution or a suspension into test tubes in a series of increasing dilutions, comprising the concentrations of 100 p.p.m. to 0.01 p.p.m. The spores are brought together with the substance to be tested on glass plates with six depressions and then stored for two days at a temperature of 20 to 22° C. Thereafter, a count is made and the percentage of destroyed spores determined. By means of the figures thus obtained a curve is composed and the $LD_{50}$ value is determined.

Via the sodium salt of the compound with the Formula IV, in which $n=1$, the zinc and manganese salts were made by double decomposition with a soluble salt of zinc or manganese, such as $ZnCl_2$ or $MnSO_4$.

It appeared that the LD$_{50}$ of the manganese salt is only 8 parts by weight per million. Moreover, this manganese salt is much stabler than Maneb, so that this new manganese compound is an extremely useful fungicide.

The fungicides obtained according to the invention have a preventive effect. They have no phytotoxic effect. They can be made up in the usual way into preparations by mixing them with a solid or liquid medium, in combination with other fungicides, e.g. Nabam, if desired. In such preparations the usual dispersing or wetting agents may further be present. These fungicidal compositions comprise as fungicidal active ingredient a compound obtained by condensing from one to two mols of ethylene diamine with one mol of formaldehyde and converting the resultant condensation product with from two to four mols of carbon disulfide under alkaline conditions, together with a wetting agent and an inert diluent.

The following examples serve to illustrate the invention:

*Example I*

78.0 g. of an 86.2% aqueous solution of ethylene diamine (1.12 mols) were introduced into a three-necked flask. To this solution first 235 cc. of water were added, and subsequently—with cooling, so that the temperature was maintained at 20° C.—84 cc. of 40% formaldehyde solution (40 grams of formaldehyde per 100 cm.$^3$) (1.12 mols). To the mixture thus obtained, 91.5 g. of NaOH, dissolved in 132.5 g. of water, and finally 175 g. of CS$_2$ were added. The reaction temperature was about 30° C. An orange-coloured, clear solution was obtained, the yield of which according to Clarke's determination of CS$_2$ was 96%. This method of preparation may be varied by first adding the CS$_2$ and thereafter the NaOH. In that case the yield according to Clarke's method is 98%. In the solutions practically no more free formaldehyde could be detected.

This solution contains the disodium salt of the compound with the Formula II. The disodium salt of the compound with the Formula IV, in which $n=1$, is obtained in exactly the same way if instead of 84 cc. of 40% formaldehyde solution only 42 cc. of the same solution are added.

*Example II*

209.0 g. of an 86.2% aqueous solution of ethylene diamine (3 mols) were introduced into a flask. To this solution, first 250 cc. of water were added and subsequently, with cooling, 225 cc. of 40% formaldehyde solution (3 mols), the temperature being maintained at 20° C.

To the mixture thus obtained, first 408 g. of 25.0% ammonia were added and then slowly, with cooling, 470 g. of carbon disulfide. The reaction temperature was about 30° C. During the reaction a white precipitate separated from the yellow reaction mixture. After completion of the reaction the precipitate was filtered off and dried in vacuo at 40° C. The product obtained was 672 g. of diammoniumpoly(N,N'-methylene ethylenebisdithiocarbamate). According to the determination method of Clarke the purity was 93% (2.42 mols). The filtrate still contained 0.33 mol of the diammonium salt according to Clarke's CS$_2$ determination. The total yield therefore was 92%.

*Example III*

The manganese salt of the compound with the Formula IV, in which $n=1$, was prepared as follows:

To 647 cc. of a solution of the sodium salt corresponding with the Formula IV in which $n=1$ and prepared according to Example I (concentration 1.55 moles per liter) 353 cc. of water were added. To this solution a solution of 179 g. of manganese sulphate (84.4%) in 1000 cc. of water was added dropwise at room temperature. A yellow precipitate was formed, which after completion of the reaction was filtered off and dried in vacuo at 40° C. The purity of the dry product was 84.3%. The yield was 91%. According to the water determination of Aufhäuser the product contained two moles of water of crystallization.

*Example IV*

The di-trimethylammonium salt of the compound with the Formula II was prepared as follows: 70 g. of 86% aqueous ethylene diamine solution were dissolved in water, and to this solution 75 cc. of 40% formaldehyde solution were added dropwise with cooling, the temperature being maintained between 18 and 20° C. To this mixture a solution of 281 g. of 42% trimethylamine was subsequently added, and then, with occasional cooling, so that the temperature was maintained between 30 and 35° C., 160 g. of carbon disulfide. The pH of the reaction solution was about 8. Finally the reaction mixture was filtered and the precipitate was dried. The yield according to Clarke's CS$_2$ determination was 95.7%.

What I claim is:

1. A fungicidal composition comprising as fungicidal active ingredient a compound obtained by condensing from one to two mols of ethylene diamine with one mol of formaldehyde and converting the resultant condensation product with from two to four mols of carbon disulfide under alkaline conditions, together with a wetting agent and an inert diluent.

2. The fungicidal composition of claim 1 wherein said fungicidal active ingredient is recovered as the manganese salt by a double decomposition with a soluble salt of manganese.

3. The fungicidal composition of claim 1 wherein said fungicidal active ingredient is recovered as the zinc salt by a double decomposition with a soluble salt of zinc.

4. A method for destroying fungus which comprises contacting said fungus for a time sufficient to destroy said fungus with an effective amount of a fungicidal active compound obtained by condensing from one to two mols of ethylene diamine with one mol of formaldehyde and converting the resultant condensation product with from two to four mols of carbon disulfide under alkaline conditions.

5. The method of claim 4 wherein said fungicidal active compound is recovered as the manganese salt by double decomposition with a soluble salt of manganese.

6. The method of claim 4 wherein said fungicidal active compound is recovered as the zinc salt by a double decomposition with a soluble salt of zinc.

References Cited in the file of this patent

UNITED STATES PATENTS 2,589,209     Kardos _____ Mar. 18, 1952

OTHER REFERENCES

De Ong: Chemistry and Uses of Pesticides, 2nd Ed., 1956, pp. 208–212.